(12) United States Patent
Monti

(10) Patent No.: US 10,917,731 B2
(45) Date of Patent: Feb. 9, 2021

(54) ACOUSTIC VALVE FOR HEARING DEVICE

(71) Applicant: Knowles Electronics, LLC, Itasca, IL (US)

(72) Inventor: Christopher Monti, Elgin, IL (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 16/237,305

(22) Filed: Dec. 31, 2018

(65) Prior Publication Data

US 2020/0213786 A1 Jul. 2, 2020

(51) Int. Cl.
*H04R 25/00* (2006.01)

(52) U.S. Cl.
CPC ........... *H04R 25/65* (2013.01); *H04R 25/402* (2013.01); *H04R 25/45* (2013.01); *H04R 25/456* (2013.01); *H04R 25/60* (2013.01); *H04R 2225/023* (2013.01); *H04R 2225/025* (2013.01)

(58) Field of Classification Search
CPC ...... H04R 25/45; H04R 25/456; H04R 25/48; H04R 25/60; H04R 25/603; H04R 25/65; H04R 25/654; H04R 2225/023; H04R 2225/025
USPC ............... 381/312, 318, 322, 324, 325, 328; 310/11, 29, 30, 12.05, 14
See application file for complete search history.

(56) References Cited

U.S. PATENT DOCUMENTS

| | | |
|---|---|---|
| 2,301,744 A | 5/1941 | Olsen |
| 3,835,263 A | 9/1974 | Killion |
| 3,836,732 A | 9/1974 | Johanson et al. |

(Continued)

FOREIGN PATENT DOCUMENTS

| | | |
|---|---|---|
| CN | 1130459 A | 9/1996 |
| DE | 2614579 A1 | 10/1977 |

(Continued)

OTHER PUBLICATIONS

European Patent Office; Extended European Search Report; EP Application No. 09819815.3; dated Jul. 25, 2013.

(Continued)

*Primary Examiner* — Jesse A Elbin
(74) *Attorney, Agent, or Firm* — Faegre Drinker Biddle & Reath LLP

(57) ABSTRACT

Acoustic valves including a housing having an acoustic passage are disclosed. A bobbin located in the housing includes a valve seat and a body member housing a magnetic core. An electrical coil is disposed about a portion of the body member, an axial dimension of the electrical coil substantially aligned with an axial dimension of the magnetic core. The electrical coil generates a magnetic field when energized. An armature is movably disposed in the housing between the valve seat and a second surface of the acoustic valve. The valve has a first stable state when the armature is positioned against the valve seat, and the valve has a second stable state when the armature is positioned against the second surface. The valve seat and the second surface are on opposite sides of the armature. The armature is movable between the valve seat and the second surface when the electrical coil is energized, such that the acoustic passage is more obstructed when the armature is positioned against the valve seat than when the armature is positioned against the second surface.

16 Claims, 7 Drawing Sheets

(56) References Cited

U.S. PATENT DOCUMENTS

| | | |
|---|---|---|
| 3,876,749 A | 4/1975 | Horvath et al. |
| 3,975,599 A | 8/1976 | Johanson |
| 4,133,984 A | 1/1979 | Akiyama |
| 4,142,072 A | 2/1979 | Berland |
| 4,605,197 A * | 8/1986 | Casey ............... F15B 13/0438 251/30.01 |
| 4,756,312 A | 7/1988 | Epley |
| 4,800,982 A | 1/1989 | Carlson |
| 4,867,267 A | 9/1989 | Carlson |
| 4,893,655 A | 1/1990 | Anderson |
| 5,033,090 A | 7/1991 | Weinrich |
| 5,068,901 A | 11/1991 | Carlson |
| 5,220,612 A | 6/1993 | Tibbetts et al. |
| 5,259,035 A | 11/1993 | Peters et al. |
| 5,349,986 A | 9/1994 | Sullivan et al. |
| 5,357,576 A | 10/1994 | Arndt |
| 5,524,056 A | 6/1996 | Killion et al. |
| 5,631,965 A | 5/1997 | Chang |
| 5,692,060 A | 11/1997 | Wickstrom |
| 5,757,933 A | 5/1998 | Preves et al. |
| 5,785,661 A | 7/1998 | Shennib |
| 5,835,608 A | 11/1998 | Warnaka et al. |
| 5,990,425 A | 11/1999 | McSwiggen |
| 6,068,079 A | 5/2000 | Hamery et al. |
| 6,075,869 A | 6/2000 | Killion et al. |
| 6,134,334 A | 10/2000 | Killion et al. |
| 6,151,399 A | 11/2000 | Killion et al. |
| 6,549,635 B1 | 4/2003 | Gebert |
| 7,136,497 B2 | 11/2006 | McSwiggen |
| 7,458,395 B2 | 12/2008 | Haynes et al. |
| 7,478,702 B2 * | 1/2009 | Berg ..................... A61F 11/08 181/135 |
| 7,548,629 B1 | 6/2009 | Griffin |
| 7,740,104 B1 | 6/2010 | Parkins |
| 7,784,583 B1 | 8/2010 | Hall |
| 8,096,383 B2 | 1/2012 | Saltykov |
| 8,199,955 B2 | 6/2012 | Akino |
| 8,338,898 B2 | 12/2012 | Schrank et al. |
| 8,391,527 B2 | 3/2013 | Feucht |
| 8,798,304 B2 | 8/2014 | Miller et al. |
| 8,923,543 B2 | 12/2014 | Sacha |
| 9,185,480 B2 | 11/2015 | Howes |
| 9,525,929 B2 | 12/2016 | Burgett |
| 2003/0059075 A1 | 3/2003 | Niederdrank |
| 2004/0046137 A1 | 3/2004 | Herbert et al. |
| 2006/0108552 A1 | 5/2006 | Herbert et al. |
| 2006/0137934 A1 | 6/2006 | Kurth |
| 2007/0075284 A1 | 4/2007 | Masamura et al. |
| 2007/0086599 A1 | 4/2007 | Wilmink |
| 2007/0176720 A1 | 8/2007 | Janssen et al. |
| 2008/0181443 A1 | 7/2008 | Harvey et al. |
| 2010/0111340 A1 * | 5/2010 | Miller ................ H04R 1/326 381/322 |
| 2011/0182453 A1 | 7/2011 | Van Hal |
| 2012/0082335 A1 | 4/2012 | Duisters |
| 2014/0169579 A1 | 6/2014 | Azmi |
| 2014/0169603 A1 | 6/2014 | Sacha et al. |
| 2015/0041931 A1 | 2/2015 | Szczech et al. |
| 2016/0150310 A1 | 5/2016 | Bakalos |
| 2016/0255433 A1 | 9/2016 | Grinker |
| 2017/0055086 A1 | 2/2017 | van Gilst |
| 2017/0208382 A1 | 7/2017 | Grinker |
| 2017/0251292 A1 | 8/2017 | Wiederholtz |
| 2018/0091892 A1 | 3/2018 | Taylor |
| 2018/0109862 A1 | 4/2018 | Lawand |
| 2019/0116436 A1 | 4/2019 | Lawland |
| 2019/0116437 A1 | 4/2019 | Bolsman |
| 2019/0166238 A1 | 5/2019 | Gilmore |
| 2019/0208301 A1 | 7/2019 | Monti |
| 2019/0208343 A1 | 7/2019 | Monti |
| 2019/0215620 A1 | 7/2019 | Albahri |
| 2019/0215621 A1 | 7/2019 | Albahri |
| 2019/0320272 A1 | 10/2019 | Jones |

FOREIGN PATENT DOCUMENTS

| | | |
|---|---|---|
| DE | 4422972 A1 | 1/1996 |
| EP | 0455203 A2 | 11/1991 |
| EP | 2747455 A2 | 6/2014 |
| EP | 3177037 A2 | 6/2017 |
| EP | 2835987 | 8/2017 |
| FR | 2596644 A1 | 10/1987 |
| KR | 10-0517059 B1 | 9/2005 |
| KR | 1020080001568 A | 1/2008 |
| WO | 1995007014 A1 | 3/1995 |
| WO | 1997009864 A1 | 3/1997 |
| WO | 1997030565 A1 | 8/1997 |
| WO | 1998047318 A1 | 10/1998 |
| WO | 1998057081 A1 | 12/1998 |
| WO | 0027166 A2 | 5/2000 |
| WO | 2006061058 A1 | 6/2006 |
| WO | 2007107736 A2 | 9/2007 |
| WO | 2008022048 A2 | 2/2008 |
| WO | 2010042613 A2 | 4/2010 |

OTHER PUBLICATIONS

European Patent Office; Extended European Search Report; EP Application No. 09819815.3; dated Dec. 22, 2016.

International Search Report and Written Opinion; International Application No. PCT/US2009/059829; dated May 20, 2010.

International Search Report and Written Opinion; International Application No. PCT/US2019/063321; dated Mar. 3, 2020.

\* cited by examiner

ACOUSTIC VALVE FOR HEARING DEVICE

TECHNICAL FIELD

This disclosure relates generally to audio devices and, more specifically, to acoustic valves implemented in audio devices.

BACKGROUND

Audio devices are known generally and include hearing aids and earphones among other devices. Some audio devices are configured to provide an acoustic seal with the user's ear. The acoustic seal may cause occlusion effects including a sense of pressure build-up in the user's ear, a blocking of externally produced sounds that the user may wish to hear, and frequency-dependent amplification of the user's own voice among other undesirable effects.

Other audio devices provide a vented coupling with the user's ear. Such a vent allows ambient sound to pass into the user's ear to reduce the negative effects of occlusion but in some circumstances may not provide optimized sound quality. One such hearing device is a receiver-in-canal (RIC) device fitted with an ear tip. RIC devices typically supplement environmental sound with amplified sound in a specific range of frequencies to compensate for hearing loss and aid in communication. The inventors have recognized a need for controlling occlusion using an actuatable acoustic valve located in a vent of the hearing device.

BRIEF DESCRIPTION OF THE DRAWINGS

The objects, features and advantages of the present disclosure will become more fully apparent to those of ordinary skill in the art upon careful consideration of the following Detailed Description and the appended claims in conjunction with the drawings described below.

Figure 1:
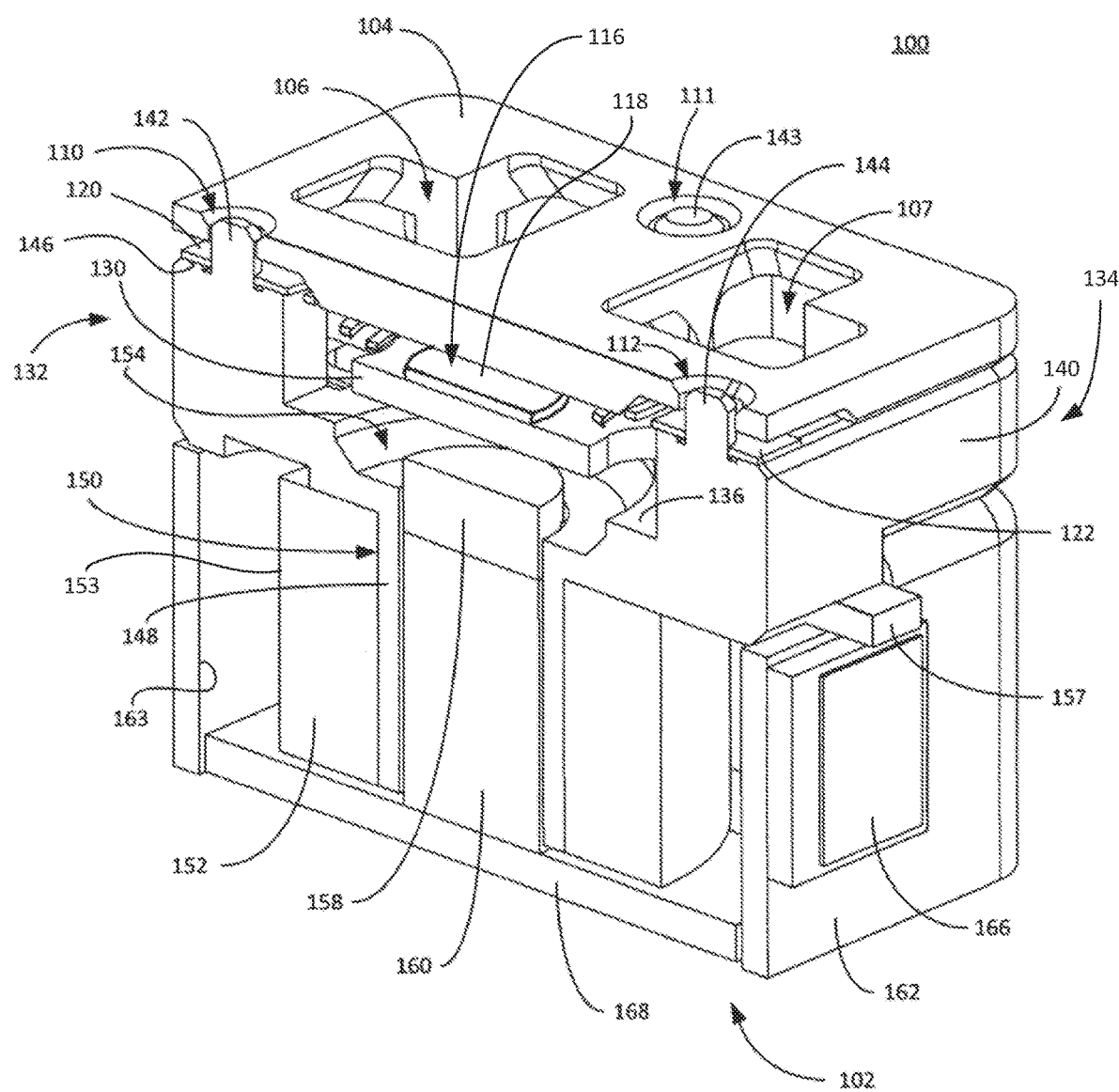
FIG. 1 is a perspective sectional view of an acoustic valve.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. The terms and expressions used herein have the ordinary technical meaning as is accorded to such terms and expressions by persons skilled in the technical field as set forth above except where different specific meanings have otherwise been set forth herein.

DETAILED DESCRIPTION

The disclosure relates to acoustic devices and sub-assemblies for acoustic devices. The acoustic valves described herein generally comprise a housing having an acoustic passage. A bobbin is located in the housing and includes a valve seat and a body member housing a magnetic core. An electrical coil is disposed about a portion of the body member such that an axis of the electrical coil is substantially aligned with an axis of the magnetic core. The electrical coil generates a magnetic field when the electrical coil is energized. An armature is movably disposed in the housing between the valve seat and a second surface of the acoustic valve. The valve has a first stable state when the armature is positioned against the valve seat, and the valve has a second stable state when the armature is positioned against the second surface. The valve seat and the second surface are on opposite sides of the armature. As suggested, the armature moves between the valve seat and the second surface when the electrical coil is energized, such that the acoustic passage is more obstructed when the armature is positioned against the valve seat than when the armature is positioned against the second surface. Specific implementations and variations on the general form are described further herein.

The acoustic valve generally includes a housing having an acoustic passage and a bobbin located therein that includes a valve seat and a body member housing a magnetic core. FIGS. 1-7 show the housing 102 in both embodiments of the acoustic valve 100 and 400 including a cover 104 and a cup 162. A bobbin 132 is placed between the cover 104 and the cup 162. The bobbin 132 has a flange 134 and a body member 148, such that the flange 134 extends generally radially from the body member 148. The flange 134 has a valve seat surface 136.

FIGS. 1-7 also show the cover 104 having multiple airflow apertures 106-109, the flange 134 having multiple airflow apertures 206-209. In other embodiments, there may be as few as a single air flow aperture or more than four apertures. The cup 162 has a support surface with first and second portions 164, 165 to support the flange 134 and a base plate 168 on the bottom. In other embodiments, the support surface can be a continuous surface without interruption by a gap for accommodating coil contacts discussed further herein. The base plate 168 supports the magnetic core or the bobbin 132. The airflow apertures 106-109 in the cover 104 as well as the airflow apertures 206-209 in the flange 134 define portions of the acoustic passage, which can be opened or closed based on the position of the armature 130.

Figure 2:
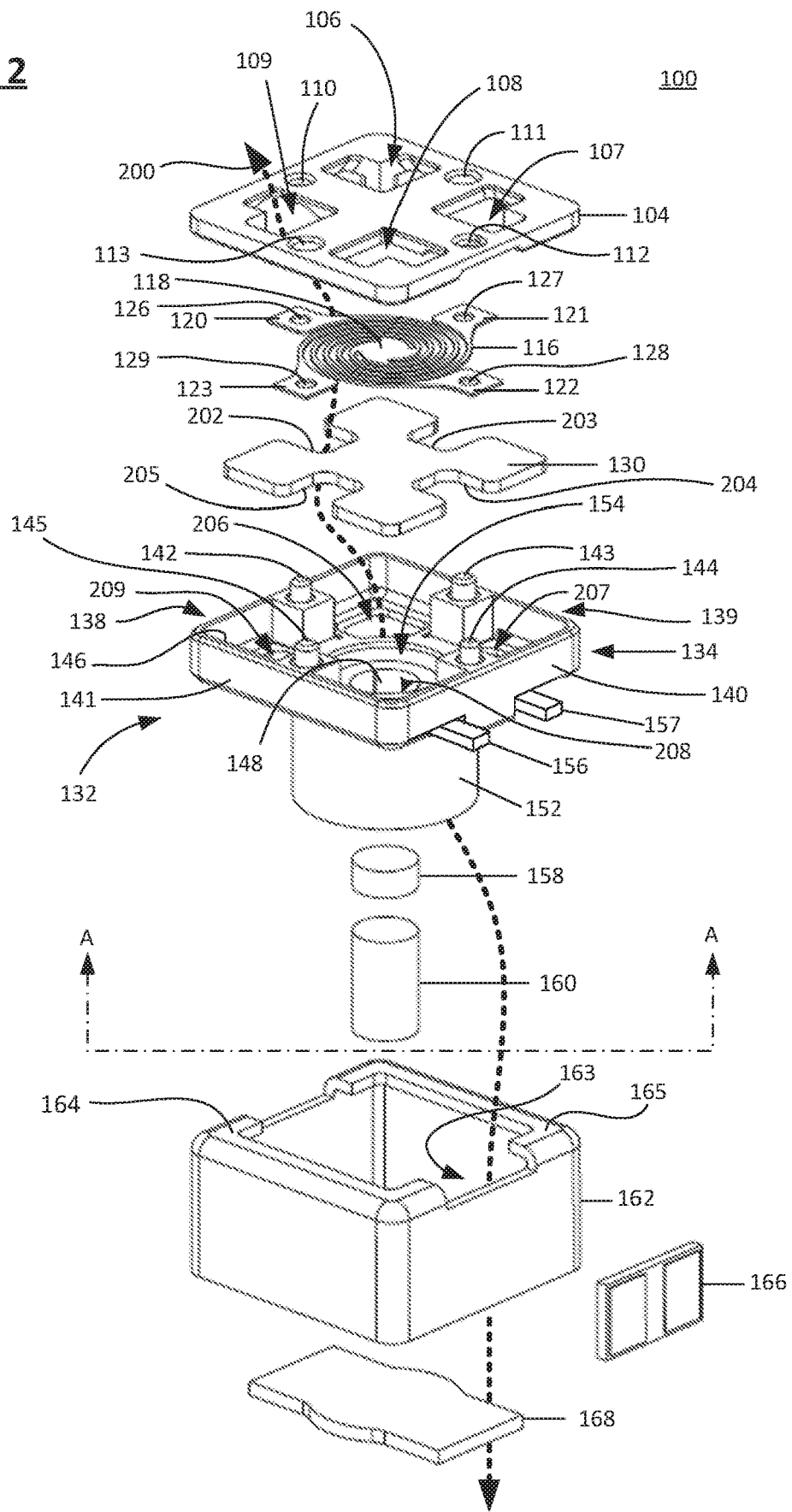
FIG. 2 is an exploded view of the acoustic valve of FIG. 1.
Figure 3:
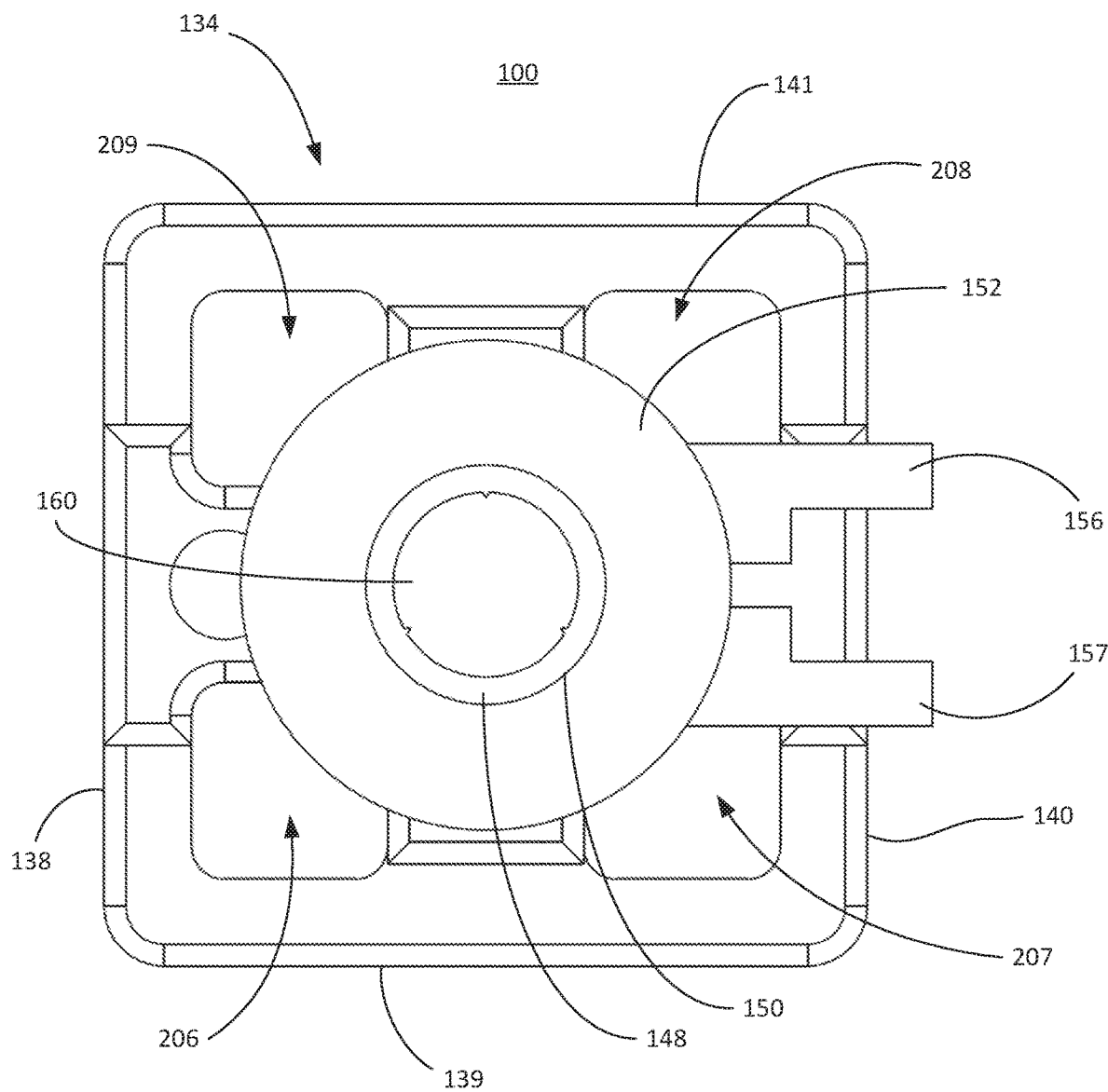
FIG. 3 is a bottom view of the acoustic valve of FIG. 2 as seen from the line A-A.

In FIGS. 1-3, the acoustic valve 100 includes a bobbin 132 having a set of alignment members 142-145 protruding from the flange 134 to support and align the positions of the spring 116 and the cover 104 with respect to the position of the flange 134. The positioning of the flange 134 makes the bobbin 132 in the valve 100 generally T-shaped. The cover 104 has alignment apertures 110-113 corresponding to the positions of the alignment members 413-416. In FIG. 1, for example, the alignment member 142 is inserted through the alignment aperture 110 of the cover 104, and the alignment member 144 is inserted through the alignment aperture 112 of the cover 104. The valve 100 in FIGS. 1-3 also has four sidewalls 138-141 in the flange 134 whose topmost surface defines a spring support surface 146. The sidewalls 138-141 come into contact with the cover 104 when assembled. As such, the flange 134 acts as a support structure for both the spring 116 and the cover 104.

Figure 4:
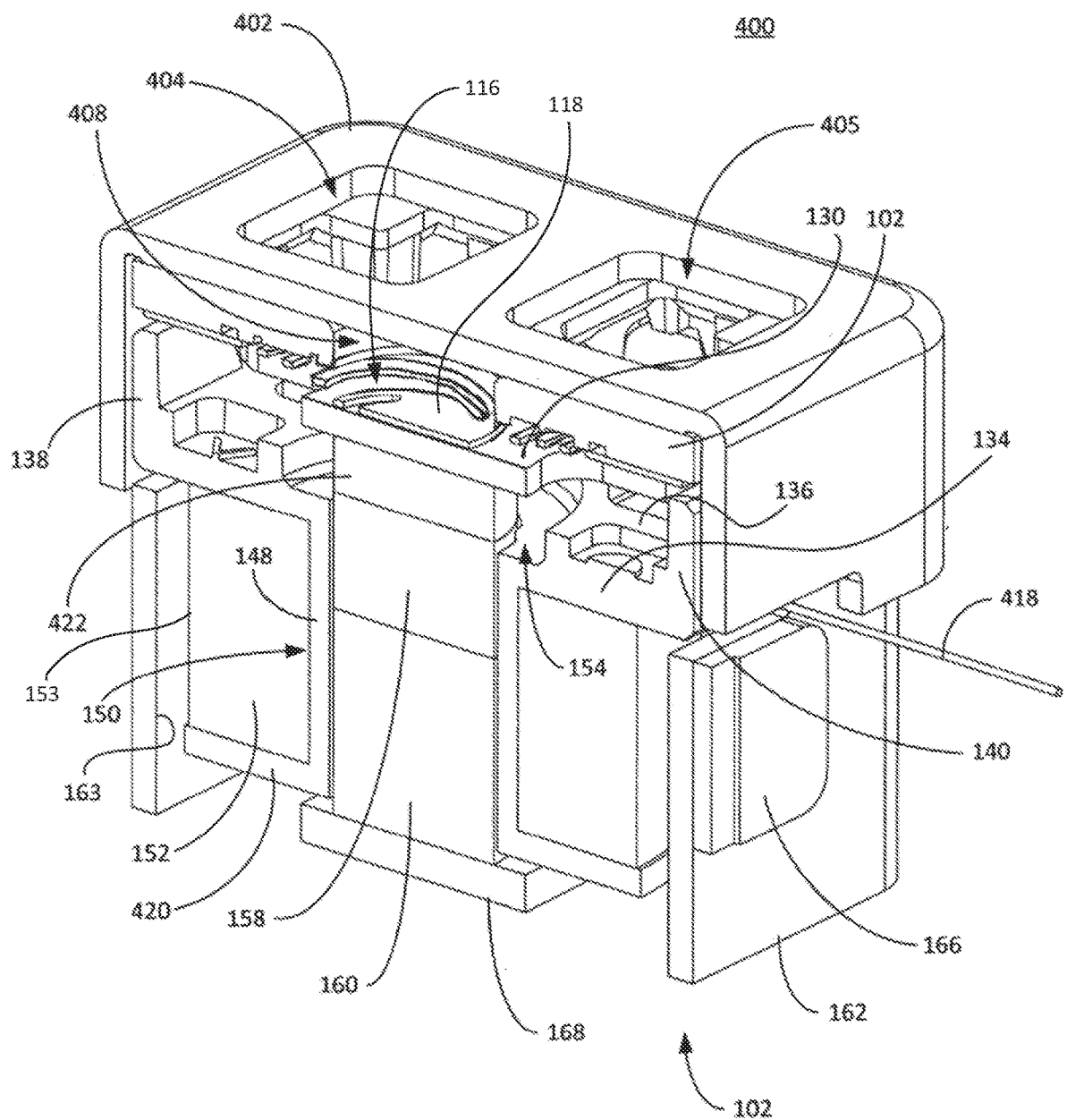
FIG. 4 is a perspective sectional view of an acoustic valve.
Figure 5:
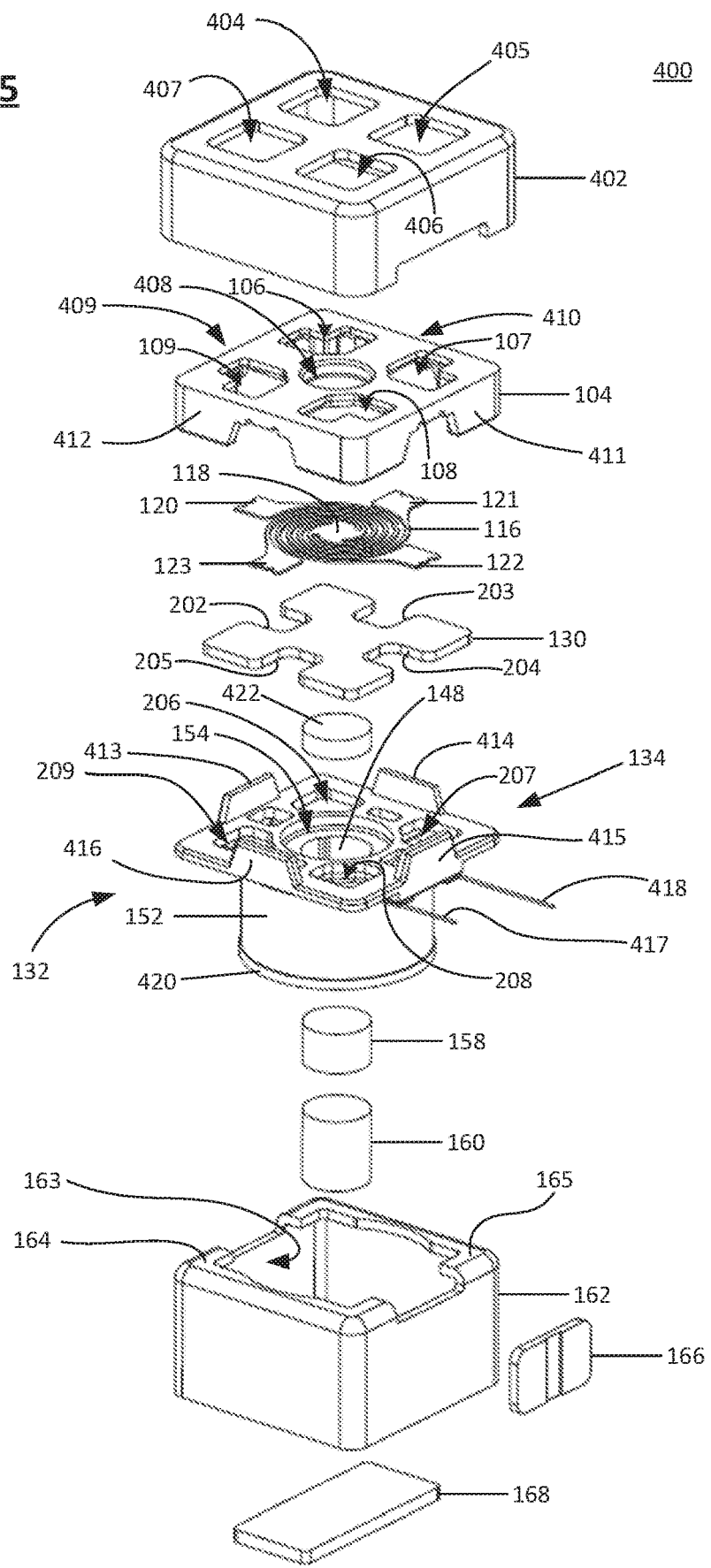
FIG. 5 is an exploded view of the acoustic valve of FIG. 4.

In FIGS. 4-7, the acoustic valve 400 includes alignment members 413-416 protruding from the flange 134 and the cover 104 includes sidewalls 409-412. When assembled, each of the alignment members 413-416 contacts with a respective sidewall 409-412 to align the cover 104 with the flange 134. Additionally, the bobbin 132 in the valve 400 has a second flange 420 extending generally radially from the body member 148 of the bobbin 132. In FIG. 4, the second flange 420 extends from a portion of the body member 148 separate from the portion of the body member 148 from which the first flange 134 extends radially. Therefore, the relative positioning of the first flange 134 and the second flange 420 make the bobbin 132 in the valve 400 generally I-shaped, i.e., with generally radial extensions from two different locations of the body member. The second flange can locate the electrical coil on the body member.

Although the housing 102 in FIGS. 1-7 has a generally rectangular cross section, the housing can have different sectional shapes, such as circular, ovular, polygonal (e.g. triangular, hexagonal, etc.), among other shapes in other embodiments. In some embodiments, the cover includes alignment members (e.g., protrusions) and the flange includes corresponding alignment apertures into which the alignment members are inserted during assembly. In some embodiments, the bobbin is made of a nonmagnetic material like plastic. In some embodiments, the bobbin is made of a thermoplastic or thermosetting material. Alternatively, other materials may be employed for the bobbin.

In some embodiments, optionally, a ferrofluid is used as a damping mechanism between the armature and the valve seat surface. In FIGS. 1, 2, 4 and 5, the bobbin 132 includes a reservoir 154 for accommodating a ferrofluid, shown as 422 in FIG. 4. A ferrofluid is a magnetic material (e.g., dust, shavings, etc.) suspended in a viscous fluid like oil. The ferrofluid is located proximate a permanent magnetic material such that the permanent magnetic material can exert magnetic effect on the ferrofluid. In some embodiments, the ferrofluid also reduces audible acoustic artifacts created when the valve changes state.

In one example, the body member 148 is a column with a circular cross-section, whereas in other examples, the body member 148 has a polygonal cross-section. The cover 104 is made from a non-ferromagnetic metal, for example, an austenitic stainless steel, aluminum alloy, plastic, or carbon fiber composite among other materials. The pole piece 160 is made of ferromagnetic material, such as 50% iron/nickel alloy. In another embodiment, the magnetic core can be formed entirely of a permanent magnet, without a pole piece, or instead of a permanent magnet the core can be formed of only hard ferromagnetic material with a high coercive force. Furthermore, the relative positions of the magnet and the pole in the magnetic core are interchangeable, i.e., the magnet can be on top of the pole or vice versa.

The acoustic valve generally includes an electrical coil disposed about the body member such that an axis of the electrical coil substantially aligns with an axis of the magnetic core. The electrical coil generates a magnetic field when energized by an electrical actuation signal received from an outside source, for example a control unit that provides the actuation signal. FIGS. 1-7 show the body member 148 holding a magnet 158 and a pole piece 160 on the inside and an electrical coil 152 around an outer surface 150 of the body member 148. The electrical coil 152 is disposed about the body member 148 such that an axial dimension of the electrical coil 152 substantially aligns with an axial dimension of the magnetic core, which is a combination of the magnet 158 and the pole piece 160.

In FIGS. 1-3, the flange 134 includes a pair of electrically conductive integrated pins 156, 157. Each of the pins 156, 157 connects to a corresponding lead of the coil 152. In one example, the pins 156, 157 are metallic and integrated directly on the flange 134, which is made of plastic. The integration is achieved by an insert molding operation or by gluing the metallic pins 156, 157 onto the flange 134. As shown in FIGS. 1-3, the pins 156, 157 are positioned to partially protrude from the sidewall 140 of the flange 134. The leads of the coil 152 are electrically coupled to corresponding pins 156, 157 by welding or other means. Similarly, wires or conductors from the control unit also are electrically coupled to corresponding pins 156, 157 to enable the coil 152 to receive actuation signals from the control unit.

Figure 6:
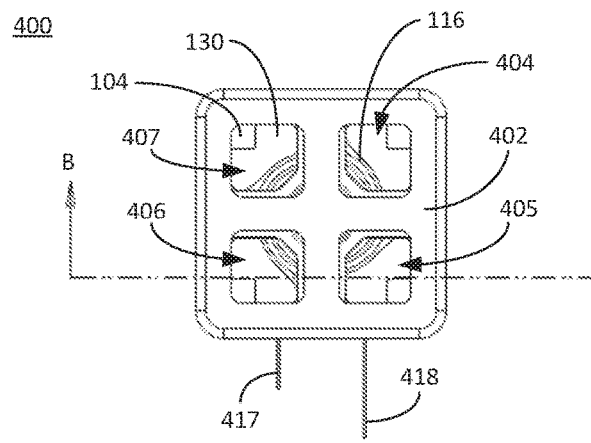
FIG. 6 is a top view of the acoustic valve of FIG. 4.
Figure 7:
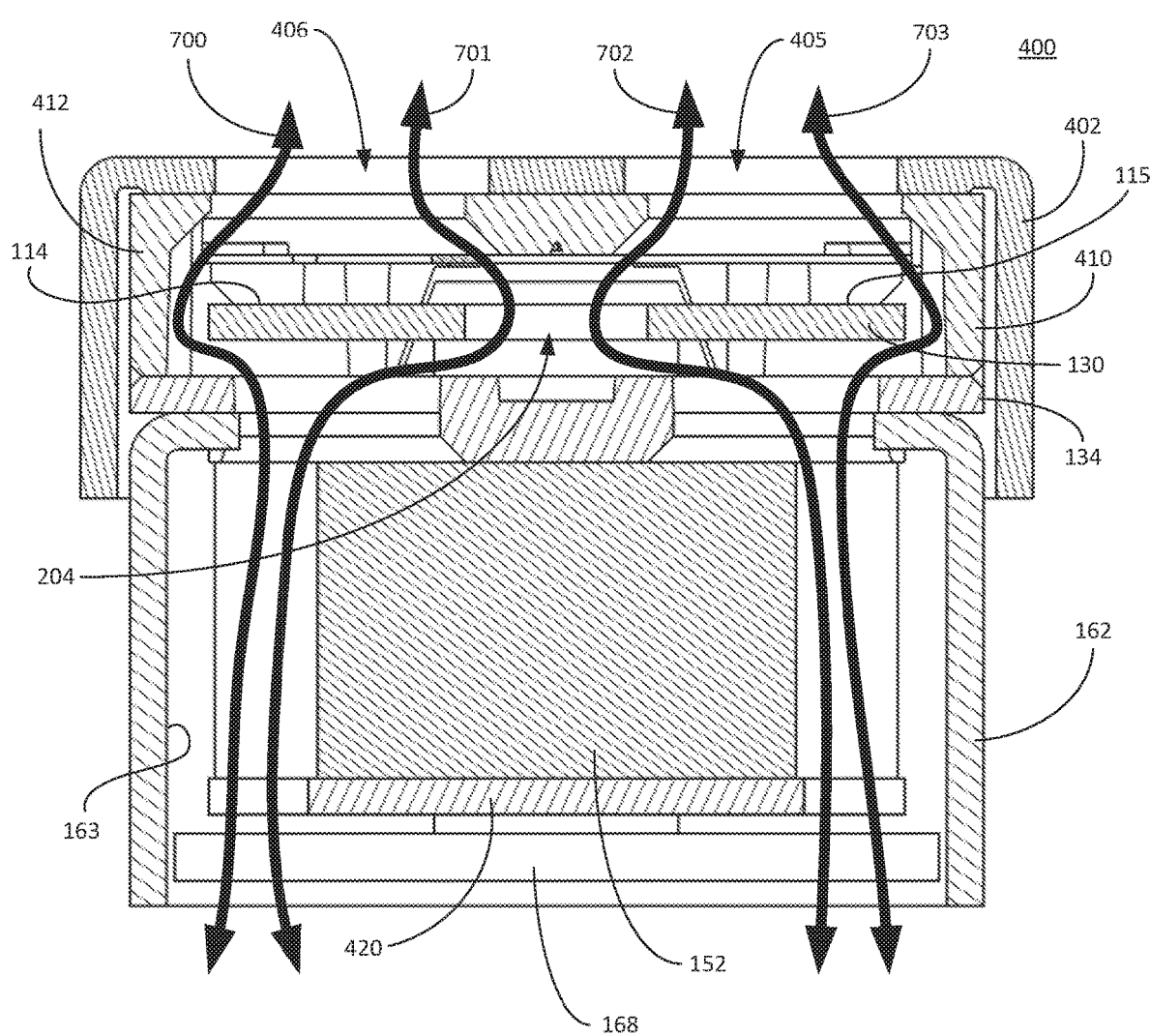
FIG. 7 is a sectional view of the acoustic valve of FIG. 4 as seen from the line B-B.
Figure 8:
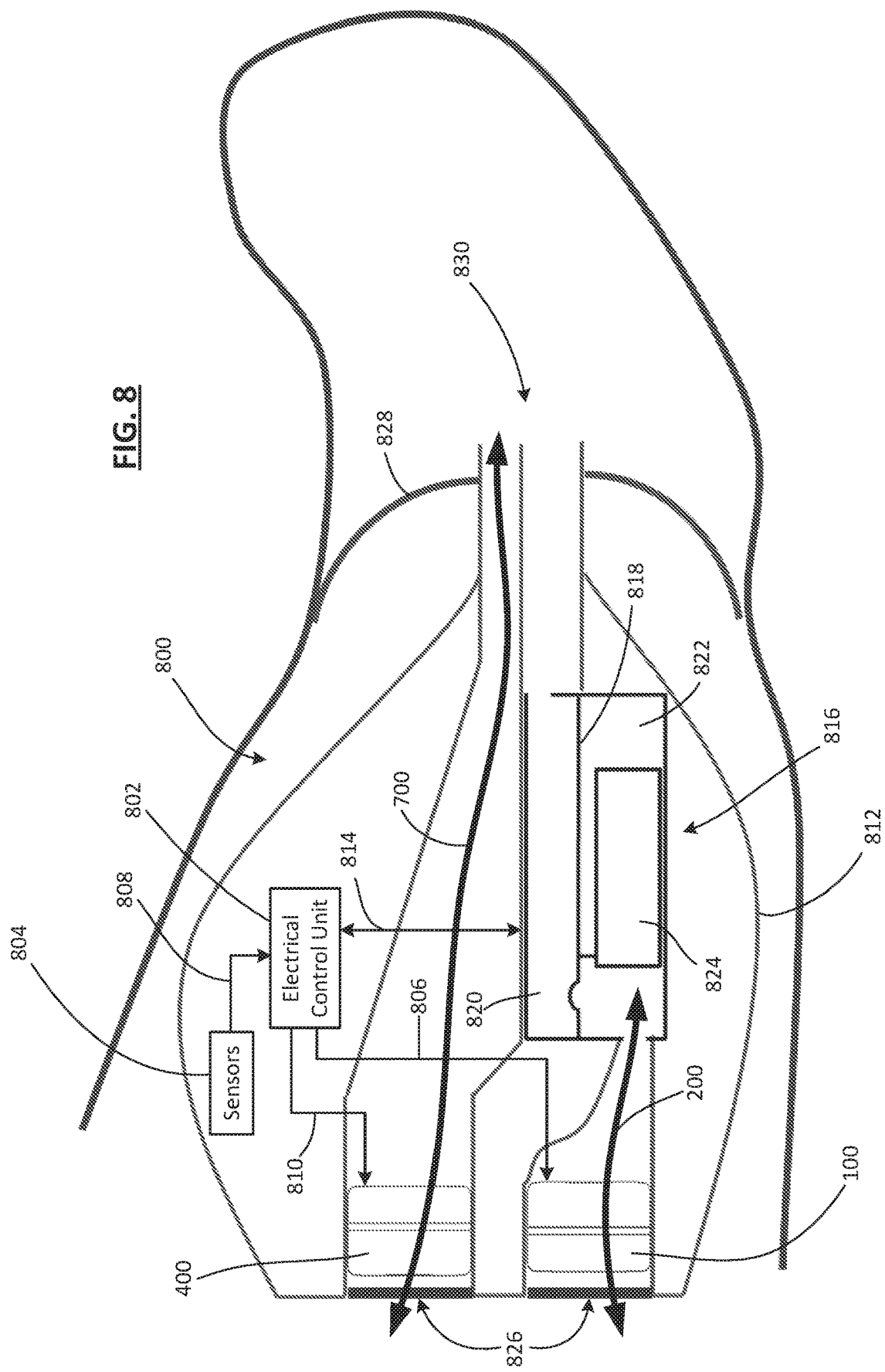
FIG. 8 is a schematic diagram illustrating a hearing device incorporating acoustic valves in different configurations.

In FIGS. 3-7, the flange 134 has a pair of leads 417, 418 from the electrical coil 152 protruding from the housing 102. Each leads 417, 418 connects to a corresponding wire of the control unit. In some embodiments, an external electrical terminal 166, which in some embodiments is a terminal board, attaches to the outer surface of the cup 162 for coupling the wires from the control unit to the coil 152. FIG. 8 shows a control unit 802 as part of a hearing device 800. Alternatively, the control unit can be located in a behind-the-ear (BTE) unit or in a host device like a cellphone, PC, tablet or other device. Energizing the coil causes the valve to change from one state to another state thereby opening or closing the valve.

The acoustic valve generally includes an armature movably disposed in the housing between the valve seat and a second surface of the acoustic valve, such that the valve has a first stable state when the armature is positioned against the valve seat and a second stable state when the armature is positioned against the second surface. The armature moves between the valve seat and the second surface when the electrical coil is energized, such that the acoustic passage is more obstructed when the armature is positioned against the valve seat than when the armature is positioned against the second surface. A spring is mounted between the cover and the flange. FIGS. 1-7 show an armature 130 having a set of notches 202-205 partially defining the airflow within the valve, and the armature 130 moves between the valve seat surface 136 and a hard stop surface 114, 115 of the cover 104. The movement of the armature 130 is supported by the spring 116. A center portion 118 of the spring 116 attaches to the armature 130 by a weld, glue or other coupling mechanism to allow the armature 130 to move between a valve seat surface 136 of the flange 134 and a hard stop surface in the cover 104. FIG. 7 shows two of the hard stop surfaces 114,115 of the cover 104. The spring 116 can be made from a flat sheet of any suitable material, like metal or plastic. The hard stop surfaces 114,115 of the cover 104 act as a stopper for the armature 130 when the spring force exceeds the magnetic force on the armature. When the electrical coil 152 is energized, the magnetic field causes the armature 130 to transition to one of two states. In one state, the armature 130 is seated on the hard stop surface 114,115 and the valve is open. In the other state, the armature 130 is seated on the valve seat surface 136 and the valve is closed.

FIGS. 1-3 show the acoustic valve 100 with the spring 116 mounted between the cover 104 and the flange 134 such that a spring support surface 146 of the flange 134 supports feet 120-123 of the spring 116. Each of the feet 120-123 has an alignment aperture 126-129 which corresponds to the position of each alignment member 142-145. For example, the alignment member 142 is to be inserted through the alignment aperture 126 of the foot 120, and the alignment member 144 through the alignment aperture 128 of the foot 122, as shown in FIG. 2. The feet 120-123 of the spring 116 attach to the spring support surface 146 by a weld, glue or other coupling mechanism. More generally, only one or two of the alignment pins 142-145 are necessary for accurate alignment.

In FIGS. 4-7, the acoustic valve 400 has the spring 116 mounted between the cover 104 and the flange 134 such that the feet 120-123 of the spring 116 attach to the cover 104, instead of the flange, by a weld, glue or some other coupling mechanism. The cover 104 further includes an additional aperture 408 to apply an external load to the spring 116, for example after the valve 400 is assembled.

In FIGS. 1-7, the armature is made of a ferromagnetic material to enable the magnetic core to exert an attractive magnetic force on the armature. The shape and size of the armature and the sealing surface are designed to complement each other such that, when overlapped, the armature and the sealing surface significantly obstruct the acoustic passage. For example, the armature can have an acoustic passage about a periphery thereof. Although the armature 130 in FIGS. 1-7 is substantially cross-shaped, the shape and size of the armature may vary in other examples depending on how the spring is mounted in the valve, the shape of the apertures in the flange or cover, as well as other conditions and requirements.

The acoustic passage is partially defined by a volume located between an outer surface of the coil and an inner surface of the housing and is more obstructed when the armature is positioned against the valve seat than when the armature is positioned against the second surface. FIGS. 1-3 show one example of an acoustic passage 200 within the valve 100. The acoustic passage 200 allows air and sound pressure waves to pass through the valve. In FIGS. 1-3, the acoustic valve 100 includes a set of four airflow apertures 106-109 in the cover 104, a set of four notches 202-205 in the armature 130, and a volume located between an outer surface 153 of the coil 152 and an inner surface 163 of the cup 162, all of which at least partially defining the acoustic passage 200. FIGS. 4-7 show the air flow passage further defined at least partially by a set of four apertures 404-407 in an optional shield 402 disposed over the cover 104 on an outside portion of the acoustic valve 400 as shown in FIGS. 6 and 7. In some embodiments, the shield 402 is metallic, for example made of a ferromagnetic material, to shield the electromagnetic behavior of the valve 400 to enable the valve 400 to continue to function properly when in the presence of stray magnetic fields that may be present, for example, in other components of the hearing device 800. In other embodiments, the shield 402 is made of any suitable material with sufficient hardness to protect at least a portion of the valve from physical damage. FIG. 7 shows four examples of different acoustic passages 700-703 that can possibly pass air and sound pressure waves through the valve 400. As shown, some of the acoustic passages 701, 702 pass through the notch 204 in the armature 130 while the other acoustic passages 700, 703 go around the periphery of the armature 130.

In the example as illustrated in FIG. 8, the hearing device 800 uses the two acoustic valves 100 and 400 which are both controlled by the electrical control unit 802. The sensors 804 detect changes in the condition of the hearing device 800 which may require a change in the state of the valves 100 and 400. Upon detection of such changes, the sensors 804 send sensor input 808 to the electrical control unit 802 which then decides whether to change the state of the valves. The electrical control unit 802 can be any suitable data processing unit which processes sensor input 808 to make the decision. After making the decision, the electrical control unit 802 sends an actuation signal to the first valve 100 through a set of wires 806 connected to the pins 156, 157 and to the second valve 400 through a second set of wires 810 connected to the leads 417,418 of the coil 152. Each wire leads to the electrical coil of the respective valve. Although FIG. 8 illustrates the sensors 804 as being inside a device housing 812 of the hearing device 800, such sensors can also be implemented outside the hearing device and connected to the electrical control unit by a wire or wirelessly, as appropriate. For example, the sensor could be on a BTE unit or in a host device. In some applications, the sensor output may be indicative of a state of the valve.

Examples of the sensors used in the hearing device as disclosed herein include microphones, touch sensors, accelerometers, differential pressure sensors, and any other suitable condition-sensing devices. The hearing device 800 includes two valves 100 and 400 such that the first valve 100 acoustically couples to the acoustic passage 200 and the second valve 400 acoustically couples to the acoustic passage 700. The first valve 100 also acoustically couples to a sound-producing electro-acoustic transducer 816. The transducer 816 includes a diaphragm 818 separating the volume inside the transducer 816 into a front volume 820 and a back volume 822, with a motor 824 disposed in the back volume 822. The transducer 816 is coupled to the electrical control unit 802 such that electrical signal 814 can travel between the electrical control unit 802 and the transducer 816. Transducers suitable for the embodiments described herein include but are not limited to balanced armature receivers and dynamic speakers. Furthermore, a plurality of transducers may be used, for example a plurality of balanced armature receivers or a dynamic speaker with one or more balanced armature receivers. Multiple transducers may be electrically and acoustically coupled in ways that are known to those having ordinary skill in the art. Balanced armature receivers are available from Knowles Electronics, LLC. In one example, two of the acoustic valves 100 are used in the hearing device 800. In another example, both of the valves used in the hearing device 800 are the acoustic valves 400. Furthermore, in yet another example, only one of the acoustic valves 100 and 400 is used in the hearing device 800, as appropriate.

The hearing device 800 includes filters 826 mounted on the device housing 812 and acoustically coupled to the ambient atmosphere. The filters 826 at least partially inhibit the migration of contaminants which might include wax, particulate matter, fluid, vapor and other debris into the hearing device. The filters 826 can be mounted externally or internally to the device 800 for easy replacement, to improved aesthetics, or to protect them from damage. Filters may be placed in other locations in acoustic passages to similarly prevent contamination from reaching valve, transducers, or other sensors, or for tuning the acoustic response of the hearing device, for example by adding acoustic damping. The hearing device 800 also includes an ear tip 828 which forms a substantial acoustic seal to the ear canal once the hearing device 800 is at least partially inserted into the ear canal. The ear tip 828 is coupled to a sound output 830 through which sound may enter the ear canal. The ear tip 828 may be made of any material as deemed suitable for the use of the hearing device, including but not limited to foams, silicone, plastic, or rubber. Suitable ear tips of various shapes may be employed, such as double- or triple-flanged ear tips, as appropriate, to provide a more isolating or more reliable acoustic seal for the user while the hearing device is at least partially inserted inside the ear canal. The ear tip may also be integral to the housing and may be custom molded to the shape of a user's ear. Any other suitable configurations may be used.

While the present disclosure and what is presently considered to be the best mode thereof has been described in a manner that establishes possession by the inventors and that enables those of ordinary skill in the art to make and use the same, it will be understood and appreciated that in light of the description and drawings there are many equivalents to the exemplary embodiments disclosed herein and that myriad modifications and variations may be made thereto without departing from the scope and spirit of the disclosure, which is to be limited not by the exemplary embodiments but by the appended claimed subject matter and its equivalents.

The invention claimed is:

1. An acoustic valve comprising:
a housing having an acoustic passage;
a bobbin located in the housing and comprising a valve seat and a body member housing a magnetic core;
an electrical coil disposed about a portion of the body member, an axial dimension of the electrical coil substantially aligned with an axial dimension of the magnetic core, the electrical coil configured to generate a magnetic field when the electrical coil is energized; and
an armature movably disposed in the housing between the valve seat and a second surface of the acoustic valve,
the valve having a first stable state when the armature is positioned against the valve seat, and the valve having a second stable state when the armature is positioned against the second surface, the valve seat and the second surface are on opposite sides of the armature,
the armature movable between the valve seat and the second surface when the electrical coil is energized,
wherein the acoustic passage is more obstructed when the armature is positioned against the valve seat than when the armature is positioned against the second surface.

2. The acoustic valve of claim 1, wherein the acoustic passage is at least partially defined by a volume located between an outer surface of the coil and an inner surface of the housing.

3. The acoustic valve of claim 1, the bobbin further comprising a fluid reservoir and
a ferrofluid disposed in the fluid reservoir, the ferrofluid located between the valve seat and the armature.

4. The acoustic valve of claim 1, wherein the valve seat is part of a first flange extending generally radially from the body member of the bobbin.

5. The acoustic valve of claim 4 further comprising a cover defining the second surface of the acoustic valve, and a spring disposed between a spring support surface of the first flange and the cover.

6. The acoustic valve of claim 4, the bobbin further comprising a second flange extending generally radially from the body member, the coil located between the first flange and the second flange.

7. The acoustic valve of claim 4 further comprising a cover defining the second surface of the acoustic valve, the cover comprising an aperture that allows an external load to be applied to the spring.

8. The acoustic valve of claim 5, the first flange comprising at least one cover alignment member aligning a complementary portion of the cover.

9. The acoustic valve of claim 4, the first flange comprising a pair of conductive pins electrically connected to corresponding leads of the coil.

10. The acoustic valve of claim 9, wherein the conductive pins protrude from a sidewall of the first flange.

11. The acoustic valve of claim 10, further comprising an electrical terminal attached to the housing and having contacts electrically coupled to the conductive pins.

12. The acoustic valve of claim 1, further comprising a cover defining the second surface of the acoustic valve, and a magnetic shield disposed over at least the cover on an outside portion of the acoustic valve.

13. An acoustic valve comprising:
a housing having an acoustic passage;
a bobbin disposed in the housing and comprising a body member housing a magnetic core;
an electrical coil disposed about the body member and configured to generate a magnetic field when the electrical coil is energized, an axial dimension of the electrical coil substantially aligned with an axial dimension of the magnetic core,
the acoustic passage at least partially defined by a volume located between an outer substantially radial surface of the coil and an inner surface of the housing; and
an armature movably disposed in the housing between a first surface and a second surface,
the valve having a first stable state when the armature is positioned against the first surface, and the valve having a second stable state when the armature is positioned against the second surface, the first surface and the second surface are on opposite sides of the armature,
the armature movable between the first surface and the second surface when the electrical coil is energized,
wherein the acoustic passage is more obstructed when the armature is positioned against the first surface than when the armature is positioned against the second surface.

14. An acoustic valve comprising:
a housing having an acoustic passage;
a bobbin disposed in the housing and comprising a plurality of conductive pins, and a body member configured to house a magnetic core;
an electrical coil disposed about the body member and configured to generate a magnetic field when the electrical coil is energized, wherein leads of the coil are connected to a corresponding one of the plurality of conductive pins; and
an armature movably disposed in the housing between a first surface and a second surface,
the valve having a first stable state when the armature is positioned against the first surface, and the valve having a second stable state when the armature is positioned against the second surface, the first surface and the second surface are on opposite sides of the armature,
the armature movable between the first surface and the second surface when the electrical coil is energized,
wherein the acoustic passage is more obstructed when the armature is positioned against the first surface than when the armature is positioned against the second surface.

15. The acoustic valve of claim 14, the bobbin further comprising a flange onto which the electrically conductive pins are attached.

16. The acoustic valve of claim 15, wherein the electrically conductive pins protrude from a sidewall of the flange.

* * * * *